(12) United States Patent
Melin

(10) Patent No.: US 11,143,530 B2
(45) Date of Patent: Oct. 12, 2021

(54) TUBE PORTION

(71) Applicant: AB SANDVIK MATERIALS TECHNOLOGY, Sandviken (SE)

(72) Inventor: Mikael Melin, Bergby (SE)

(73) Assignee: AB Sandvik Materials Technology, Sandviken (SE)

( * ) Notice: Subject to any disclaimer, the term of this patent is extended or adjusted under 35 U.S.C. 154(b) by 0 days.

(21) Appl. No.: 15/734,268

(22) PCT Filed: Jun. 12, 2019

(86) PCT No.: PCT/EP2019/065406
§ 371 (c)(1),
(2) Date: Dec. 2, 2020

(87) PCT Pub. No.: WO2019/243142
PCT Pub. Date: Dec. 26, 2019

(65) Prior Publication Data
US 2021/0215516 A1 Jul. 15, 2021

(30) Foreign Application Priority Data
Jun. 20, 2018 (EP) .................................... 18178766

(51) Int. Cl.
*G01D 11/24* (2006.01)
*B21C 37/15* (2006.01)
(Continued)

(52) U.S. Cl.
CPC .......... *G01D 11/245* (2013.01); *B21C 37/154* (2013.01); *F16L 9/02* (2013.01); *F16L 41/008* (2013.01)

(58) Field of Classification Search
CPC ........ F16L 9/02; F16L 41/008; B01D 11/245; B21C 37/06; B21C 37/08; B21C 37/154; A47L 9/246; H01B 7/0072
(Continued)

(56) References Cited

U.S. PATENT DOCUMENTS 3,127,227 A * 3/1964 Edwards ................. A47L 9/246
439/195
3,163,707 A * 12/1964 Darling ................ H01B 7/0072
174/47
(Continued)

FOREIGN PATENT DOCUMENTS

CA 2095957 A1 11/1994
CN 202066820 U 12/2011
(Continued)

OTHER PUBLICATIONS

International Search Report and Written Opinion dated Sep. 17, 2019, issued in corresponding International Patent Application No. PCT/EP2019/065406.
(Continued)

*Primary Examiner* — Patrick F Brinson
(74) *Attorney, Agent, or Firm* — Morgan, Lewis & Bockius LLP

(57) ABSTRACT

Herein a metallic tube portion is disclosed. The metallic tube portion comprises a connection element. The connection element comprises a protruding portion of a metallic outer tube of the metallic tube portion and a housing member. The housing member is welded to the protruding portion and at least a further portion of the metallic outer tube and/or a portion of a metallic inner tube. A signal line extends at least partially through the connection element.

13 Claims, 4 Drawing Sheets

(51) Int. Cl.
*F16L 9/02* (2006.01)
*F16L 41/00* (2006.01)

(58) Field of Classification Search
USPC ....... 138/103, 104, 109, 127, 137, 138, 114; 174/47, 74 R; 439/192, 194
See application file for complete search history.

(56) References Cited

U.S. PATENT DOCUMENTS

| | | | | | |
|---|---|---|---|---|---|
| 4,094,535 | A | * | 6/1978 | Minton | A47L 9/246 |
| | | | | | 174/47 |
| 4,215,384 | A | * | 7/1980 | Elson | F16L 11/127 |
| | | | | | 138/103 |
| 4,229,613 | A | * | 10/1980 | Braun | B29D 23/001 |
| | | | | | 138/103 |
| 4,462,649 | A | * | 7/1984 | Medford | F16L 33/32 |
| | | | | | 174/47 |
| 4,517,404 | A | * | 5/1985 | Hughes | A47L 9/24 |
| | | | | | 138/109 |
| 4,940,415 | A | * | 7/1990 | Westergren | H01R 13/64 |
| | | | | | 439/192 |
| 10,408,683 | B2 | | 9/2019 | Glasheen et al. | |
| 2014/0053939 | A1 | * | 2/2014 | Kaye | A61M 16/0875 |
| | | | | | 138/109 |

FOREIGN PATENT DOCUMENTS

| | | |
|---|---|---|
| CN | 204785146 U | 11/2015 |
| CN | 105556265 A | 5/2016 |
| CN | 106090484 A | 11/2016 |
| JP | 2004-157052 A | 6/2004 |
| WO | 2017/102227 A1 | 6/2017 |
| WO | 2018/091543 A1 | 5/2018 |

OTHER PUBLICATIONS

First Office Action dated Jun. 2, 2021 in Chinese Patent Application 201980038825.3.

* cited by examiner

TUBE PORTION

TECHNICAL FIELD

The present disclosure relates to a metallic tube portion.

BACKGROUND

Metallic tubes are used in many different applications within different industries. In many of those applications, the tubes are exposed to various kinds of stress and/or strain. In some cases, sensors are therefore attached to these tubes. Such sensors may be e.g. one of a temperature sensor or a strain sensor. The sensors are protected against environmental influences. The sensors and signal lines to the sensors are protectively mounted in the tube.

A signal line connects such a sensor to equipment arranged externally of the metallic tube. Accordingly, the signal line, or a further line connected to the signal line, needs to extend from the metallic tube to the externally arranged equipment.

SUMMARY

It is an aim of the present disclosure to provide for a signal line to extend from a metallic tube portion in a protected manner.

According to an aspect, this is achieved by a metallic tube portion having a longitudinal extension and comprising a metallic inner tube having an outer surface, a signal line extending longitudinally along at least part of the outer surface of metallic inner tube, a metallic outer tube extending along at least part of the metallic inner tube outside of the metallic inner tube and outside of the signal line, and optionally a metallic intermediate tube arranged between the metallic inner and outer tubes. The metallic tube portion comprises a connection element, wherein the connection element comprises a protruding portion of the metallic outer tube and a housing member, the housing member being welded to the protruding portion and at least a further portion of the metallic outer tube, and/or a portion of the metallic inner tube, and/or a portion of the metallic intermediate tube, and wherein the signal line, and/or a signal conduit connected to the signal line, extends at least partially through the connection element.

Since the signal line and/or the signal conduit connected to the signal line extends at least partially through the connection element, the signal line is diverted from the metallic tube portion in a protected manner. As a result, the above mentioned aim is achieved.

It has been realised by the inventor that a part of a metallic tube portion where a signal line is diverted from the metallic tube portion, herein referred to as a connection element, has to reliably protect the signal line. Hence, the provision of welded joints between the housing member, protruding portion, and portions of the metallic outer and/or inner and/or intermediate tube. Producing welded joints however, subject the metallic tube portion to high temperatures, may be damaging to the signal line.

The inventor has also realised that by the provision of the protruding portion of the metallic outer tube forming part of the connection element, welded joints can be arranged at a distance from the signal line, thus, avoiding directly subjecting the signal line to high temperatures. Specifically, a welded joint extending across the signal line is provided at an outer end of the protruding portion, i.e. at a radial distance from the outer surface of the metallic inner tube where the signal line is arranged.

The metallic tube portion may form a shorter or longer tubular element. The metallic tube portion may be connected to other tubular elements for forming a continuous tubular conduit. For instance, end portions of the metallic tube portion may be welded to other tubular elements.

The metallic tube portion may be configured for conducting a fluid medium therethrough. The metallic inner tube forms a functional tube of the metallic tube portion. That is, the metallic inner tube may be formed from a material configured to withstand the conditions inside the metallic inner tube. The material may for instance be selected to withstand corrosive media, and/or high temperature, and/or high-pressure.

The metallic inner tube may be formed from a material configured to withstand load that the metallic tube portion is subjected to. The material may for instance be selected to withstand tensile and/or compressive stress.

The metallic outer tube may form a protective tube of the metallic tube portion. That is, the metallic outer tube may protect the signal line, and optionally the metallic inner tube, from conditions and/or damage, the metallic outer tube may be subjected to from its outside.

For the signal line to be connected to equipment external of the metallic tube portion, the signal line is diverted from the metallic tube portion via the connection element. Alternatively, the above mentioned signal conduit connected to the signal line may be diverted from the metallic tube portion via the connection element.

The signal line may be any kind of signal line extending along at least part of the longitudinal extension of the metallic tube portion. For instance, the signal line may be connected to a functional element, such as a sensor, connected to and/or forming part of the metallic tube portion. Alternatively, the signal line may simply be led along the metallic tube portion, without being connected to any functional element of the metallic tube portion. In such case, the metallic tube portion may lack functional elements, and may only form a carrier of the signal line.

The protruding portion protrudes from an outer surface of the metallic tube portion. The protruding portion may be formed by bending a piece of the metallic outer tube out from the metallic tube portion.

Since the protruding portion forms part of the metallic outer tube and protrudes from the metallic tube portion, and since the housing member is welded to the protruding portion, the signal line may pass from the outer surface of the metallic inner tube into the connection element underneath the protruding portion at a distance from a welded joint between the housing member and the protruding portion. Thus, during manufacturing of the metallic tube portion, the signal line will not be subjected to direct heat from a welding operation.

The connection element may comprise more than one protruding portion of the metallic outer tube.

The connection element forms a space through which the signal line, and/or the signal conduit, extends at least partially. The space may be formed between the protruding portion and the housing member. Additionally, the space may be formed between the housing member and the metallic inner tube and/or the metallic outer tube and/or the intermediate tube. Alternatively, the space may be formed between the protruding portion and the housing member, and within the housing member as such.

The connection element forms a protective compartment for the signal line and/or the signal conduit.

Suitably, the connection element forms an integrated part of that the metallic tube portion. That is, the housing member is secured against the metallic inner tube and/or the metallic outer tube and/or the intermediate tube in a manner such that the signal line and/or the signal conduit inside the connection element cannot be damaged by conditions outside the metallic tube portion. For instance, the housing member is secured also against the metallic inner tube and/or the metallic outer tube and/or the intermediate tube by welding. Thus, one or more welded joints between the housing member and the metallic inner tube and/or the metallic outer tube and/or the metallic intermediate tube contribute to the connection element being an integrated part of the metallic tube portion.

The connection element in turn, is configured for being connected to a further conduit such as a pipe or hose, through which the signal line and/or the signal conduit may extend in order to be directly or indirectly connected to equipment external of the metallic tube portion. The further conduit protects the signal line and/or the signal conduit from ambient conditions. A connection between the connection element and the further conduit may be permanent, such as a welded connection, alternatively, the connection may be releasable, such as a threaded connection.

According to embodiments, at least part of the signal line, and/or at least part of the signal conduit, may extend separated from the metallic inner tube within the connection element. In this manner, the signal line and/or signal conduit may be diverted from the metallic inner tube for being connected to equipment external of the metallic tube portion via the connection element.

According to embodiments, the protruding portion of the metallic outer tube may protrude from an outer surface of the metallic tube portion, and the signal line, and/or the signal conduit, may extend underneath the protruding portion. In this manner, the signal line and/or the signal conduit may extend at a distance from a welded joint between the protruding portion and the housing member.

According to embodiments, the protruding portion of the metallic outer tube may be integrally formed with the metallic outer tube. In this manner the protruding portion may be formed in one and the same piece of material as the metallic outer tube. Thus, the signal line may extend underneath the protruding portion into the connection element. Underneath the protruding portion, the signal line will not be subjected to direct heat from a welding operation, in which the housing member is joined with the protruding portion.

According to embodiments, the connection element may comprise an opening for leading the signal line, and/or the signal conduit, therethrough. In this manner, the signal line and/or the signal conduit may be connected to equipment external of the metallic tube portion via the opening of the connection element. Thus, the connection element forms a diverting member for the signal line and/or the signal conduit. That is, a diverting member for diverting the signal line, and/or the signal conduit connected to the signal line, from the metallic tube portion to equipment external of the metallic tube portion.

According to embodiments, the signal line may comprise an electrically conducting thin-film layer forming part of a stack of thin-film layers deposited on the outer surface of the metallic inner tube. In this manner, the signal line may be formed by thin film technology. Thus, the metallic tube portion, including the signal line, maybe manufactured in an automated manufacturing process.

According to embodiments, the metallic tube portion may comprise a metallic intermediate tube arranged between the metallic inner and outer tubes. The metallic intermediate tube may comprise a slit extending at least partially along the longitudinal extension L, wherein the signal line may be arranged in the slit. In this manner, there may be provided a space extending along the metallic tube portion, in which space, i.e. the slit, the signal line may extend along the metallic inner tube. Moreover, during manufacturing of the metallic tube portion, after joining the metallic intermediate tube with the metallic inner tube, the signal line may be safely and securely positioned within the slit prior to joining the metallic outer tube with the metallic intermediate tube. The metallic intermediate tube forms a separation tube between the metallic inner and outer tubes.

According to embodiments, the metallic tube portion may comprise a sensor, wherein the sensor may be arranged on the outer surface of the metallic inner tube, and wherein the signal line may be connected to the sensor. In this manner, there may be provided a metallic tube portion comprising a sensor, the signal line of the which may be connected to equipment external of the metallic tube portion.

According to embodiments, the metallic outer tube may extend over the sensor. In this manner, the sensor may be protectively arranged within the metallic tube portion.

Further features of, and advantages will become apparent when studying the appended claims and the following detailed description.

BRIEF DESCRIPTION OF THE DRAWINGS

Various aspects and/or embodiments, including its particular features and advantages, will be readily understood from the example embodiments discussed in the following detailed description and the accompanying drawings, in which.

DETAILED DESCRIPTION

Aspects and/or embodiments will now be described more fully. Like numbers refer to like elements throughout. Well-known functions or constructions will not necessarily be described in detail for brevity and/or clarity.

Figure 1A:
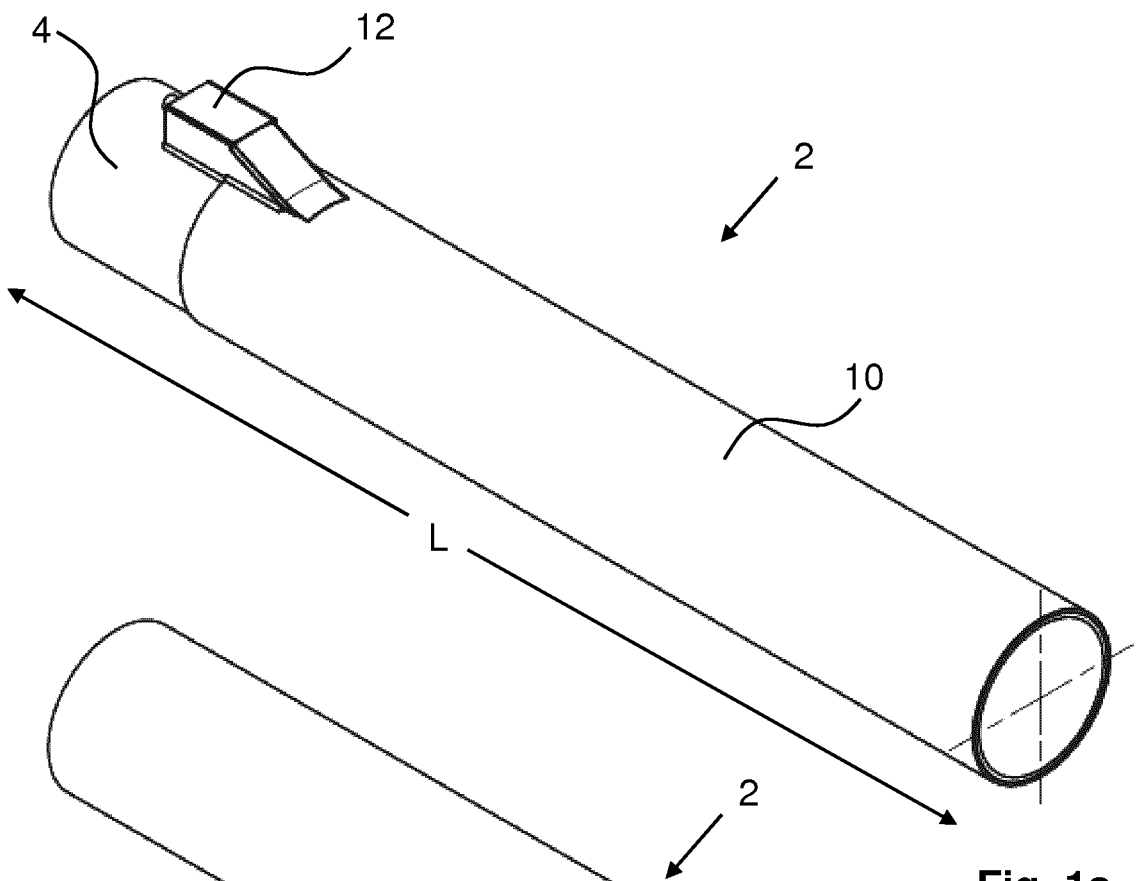
FIGS. 1a and 1b illustrate two different views of a metallic tube portion according to embodiments.
Figure 1B:
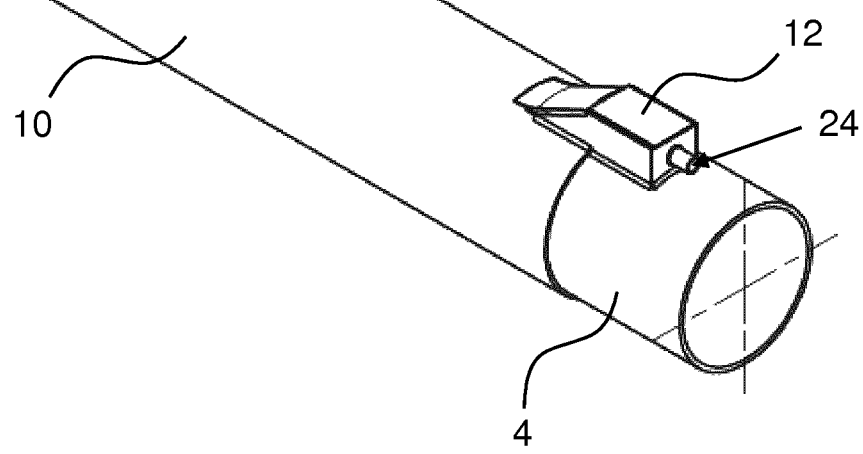

FIGS. 1a and 1b illustrate two different views of a metallic tube portion 2 according to embodiments. The metallic tube portion 2 has a longitudinal extension L and comprises a metallic inner tube 4 and a metallic outer tube 10. The metallic outer tube 10 extends along at least part of the metallic inner tube 4. A signal line, not shown, extends along the metallic inner tube 2 between the metallic inner and outer tubes 4, 10.

The metallic tube portion 2 comprises a connection element 12. The signal line and/or a signal conduit connected to the signal line extends at least partially through the connection element 12. In FIGS. 1a and 1b the signal line and/or the signal conduit is not visible.

The connection element 12 forms a protective compartment for the signal line and/or the signal conduit. The connection element 12 forms an integrated part of that the metallic tube portion 2. That is, parts forming the connection element 12 are connected to each other and the metallic inner and/or outer tubes 4, 10 via welded joints. Suitably, the welded joints provide a gas tight seal. The signal line and/or the signal conduit inside the connection element 12 are safely arranged within the connection element 12 and cannot be damaged by ambient conditions outside the metallic tube portion 2 during use of the metallic tube portion 2. Accordingly, the signal line is diverted from the metallic tube portion 2 in a protected manner.

The connection element 12 comprises an opening 24 for leading the signal line and/or the signal conduit connected to the signal line, therethrough. Thus, the signal line and/or the signal conduit may extend through the opening 24 and may be connected to equipment external of the metallic tube portion 2. Accordingly, the connection element 12 is configured for diverting the signal line and/or the signal conduit from the metallic tube portion 2.

Mentioned purely as an example, the metallic tube portion 2 may be arranged in a furnace as part of a waterwall panel. Water, steam, or superheated steam may flow through the metallic tube portion 2. At least part of an outer surface of the metallic tube portion 2 is subjected to heat from combustion inside the furnace. According to a further example, the metallic tube portion 2 may form part of a load carrying structure, such as a truss structure.

Figure 2:
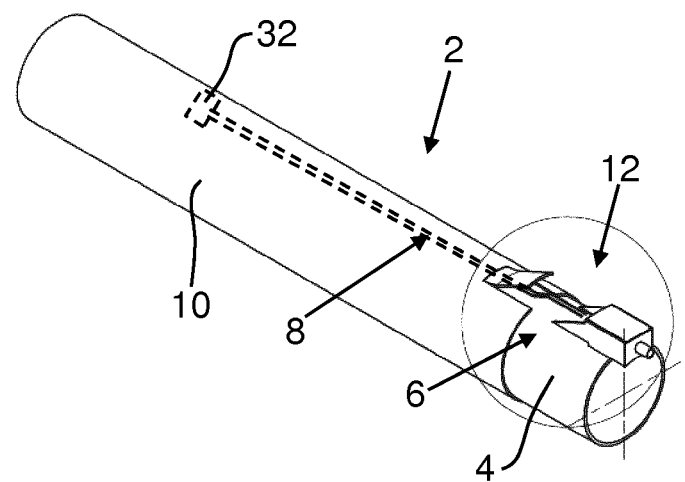
FIGS. 2, 2a and 2b illustrate further views of the metallic tube portion of FIGS. 1a and 1b.
Figure 2A:
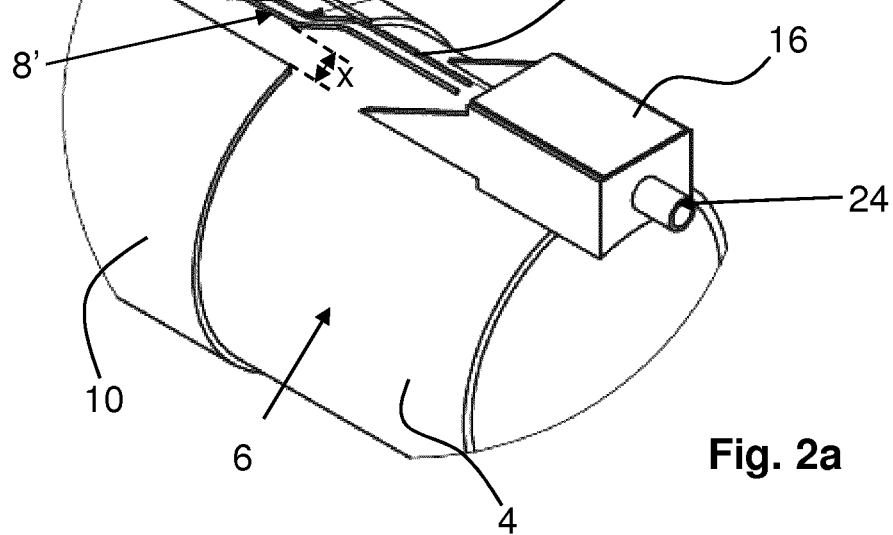
Figure 2B:
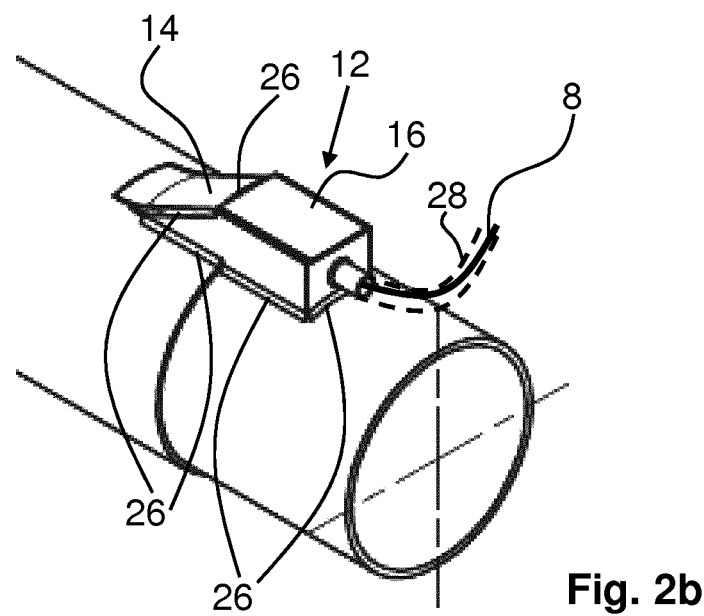

FIGS. 2, 2a and 2b illustrate further views of the metallic tube portion 2 of FIGS. 1a and 1 b. FIG. 2 shows the metallic tube portion 2 with the connection element 12 in an exploded view. FIG. 2a shows an enlarged view of the encircled area of FIG. 2. FIG. 2b shows the same view as FIG. 2a with the connection element 12 connected to the metallic inner and outer tubes 4, 10.

The metallic inner tube 4 has an outer surface 6. As mentioned above, the metallic tube portion 2 comprises a signal line 8. The signal line 8 extends longitudinally along at least part of the outer surface 6 of the metallic inner tube 4. The metallic outer tube 10 extends outside of the metallic inner tube 4 and outside of the signal line 8. That is, in these embodiments the outer surface 6 of the metallic inner tube 4 is largely covered by the metallic outer tube 10.

In these embodiments the metallic tube portion 2 comprises two signal lines 8, 8'. According to other embodiments the metallic tube portion 2 may comprise only one signal line, or more than two signal lines.

The signal line 8 may comprise a wire. The signal line 8 may comprise a fibre. The wire may for instance be an electrically isolated electrically conductive wire. The fibre may be an optical fibre. The term signal line is to be interpreted broadly and may cover not only lines for transferring signals and signal voltage levels from/to sensors, but also electric power for power supply to electronic power consumers.

The metallic outer tube 10 comprises a protruding portion 14. Suitably, the protruding portion 14 is integrally formed with the metallic outer tube 10. The protruding portion 14 may for instance be formed by providing two parallel longitudinal cuts in the metallic outer tube 10 and bending a portion of the metallic outer tube 10 between the two cuts radially outwardly from the metallic outer tube 10.

The connection element 12 comprises the protruding portion 14 and a housing member 16. In these embodiments, the housing member 16 is inserted between the protruding portion 14 and the metallic outer tube 10 such that a protective compartment for diverting the signal line 8 is formed.

The housing member 16 comprises the opening 24 of the connection element 12 and is configured to be welded against the protruding portion 14 and at least a further portion of the metallic outer tube 10. In an assembled state, when connected to the metallic outer tube 10, and optionally to the metallic inner tube 4, the only access to a space within the connection element 12 is via the opening 24. Besides these features, the shape and design of the housing member 16 is not limited to any particular features.

In these embodiments, the housing member 16 is substantially box-shaped and comprises two triangular portions, which are adapted to fit against the protruding portion 14 and the further portion of the metallic outer tube 10. The housing member 16 is welded to the protruding portion 14, the metallic outer tube 10, and the metallic inner tube 4. That is, welded joints 26 connect the housing member 16 with the protruding portion 14, the metallic outer tube 10, and the metallic inner tube 4, see FIG. 2b. Thus, access to an inside of the connection element 12 is only possible via the opening 24.

Suitably, the welded joints 26 provide a gas tight seal between the housing member 16 and the protruding portion 14, and between the housing member 16 and the metallic inner and outer tubes 4, 10.

Alternative example embodiments of housing members are discussed below with reference to FIGS. 4 and 5.

The signal line 8, or a signal conduit 30 connected to the signal line 8, can only be diverted from the metallic tube portion 2 via the opening 24. In the use of the metallic tube portion 2, a further conduit 28 through which the signal line 8 and/or the signal conduit 30 extends is connected to the connection element 12 at the opening 24. The further conduit 28 may be a hose or a pipe. The further conduit 28 is indicated with broken lines in FIG. 2b. The further conduit 28 may be permanently or releasably connected to the connection element 12. According to some embodiments an interface may be provided between the connection element 12 and the further conduit in 28. Such an interface may form a mechanical interface between the connection element 12 and the further conduit 28 and optionally, an interface between the signal line 8 and/or the signal conduit 30 and a further line extending through the further conduit 28.

As mentioned above, the signal line 8 extends along the outer surface 6 of the metallic inner tube 4. The signal line 8 may be of such a kind that it can also extend freely, i.e. separate from the metallic inner tube 4, at a longitudinal position along the metallic tube portion 2 where the signal line 8 is to be diverted from the metallic tube portion 2. An electrically isolated electrical wire is an example of such a signal line. Other kinds of signal lines may be more difficult to separate from the metallic inner tube 4. For instance, a signal line 8 formed by an electrically conducting thin-film layer forming part of a stack of thin-film layers deposited on the outer surface 6 of the metallic inner tube 4 is an example of a signal line of the latter kind.

For instance, if the signal line 8 is difficult to separate from the metallic inner tube 4, a signal conduit 30 may be connected to the signal line 8. Then the signal conduit 30 may extend separate from the metallic inner tube 4, at least partially through the connection element 12. Similarly, a signal line 8 which is easily separated from the metallic inner tube 4 may be connected to a signal conduit 30, e.g. for providing an extension of the signal line 8.

Accordingly, at least part of the signal line 8, and/or at least part of the signal conduit 30, may extend separated from the metallic inner tube 4 within the connection element 12, as shown in FIG. 2a.

The protruding portion 14 of the metallic outer tube 10 protrudes from an outer surface 20 of the metallic tube portion 2. The signal line 8, and/or the signal conduit 30, extends underneath the protruding portion 14. Since the protruding portion 14 forms part of the metallic outer tube 10 and the connection element 12, no welded joint is required proximally across the signal line 8. Thus, the welded joints 26 are only arranged at a distance from the signal line 8, between the protruding portion 14 and the housing member 16, and between at least a further portion of the metallic outer tube 10 and the housing member 16. Thus, during manufacturing of the metallic tube portion 2, the signal line 8 will not be subjected to direct heat from a welding operation. Accordingly, the metallic tube portion 2 may be provided with a securely connected connection element 12 for diverting the signal line 8 and/or the signal conduit 30 from the metallic portion 2, without damaging the signal line 8 and/or the signal conduit 30.

In order to maintain a comparatively low temperature in a region of the signal line 8, during welding of the housing member 16 to the protruding portion 14, to a further portion of the metallic outer tube 10, and/or to a portion of the metallic inner tube 4, an inside of the metallic inner tube 4 may be cooled during the welding operation, e.g. by compressed air flowing there through.

Mentioned purely as an example, seen in a circumferential direction of the metallic tube portion 2, the signal line 8 may extends at least 7 mm from an edge of the protruding portion 14 of the metallic outer tube 10, see FIG. 2a and the distance marked x.

The metallic outer tube 10 may be arranged on the metallic inner tube 4 in a number of different ways. For instance, the metallic outer tube 10 and the metallic inner tube 4 have been joined in a drawing process. That is, the metallic inner tube 4 is positioned inside the metallic outer tube 10. The thus arranged inner and outer tubes 4, 10 are drawn through a die. A different alternative may be to join the inner and outer tubes 4, 34, 10 by shrink-fitting.

Referring to FIG. 2, the metallic tube portion 2 comprises a sensor 32. The sensor 32 is arranged on the outer surface 6 of the metallic inner tube 4. The signal line 8 is connected to the sensor 32. The metallic outer tube 10 extends over the sensor 32. The sensor 32 may be selected from one of a resistive sensor, a capacitive sensor, a thermocouple, a fibre Bragg grating sensor, or a combination thereof. Thus, for instance strain or temperature of the metallic tube portion 2 may be measured.

Figure 6:
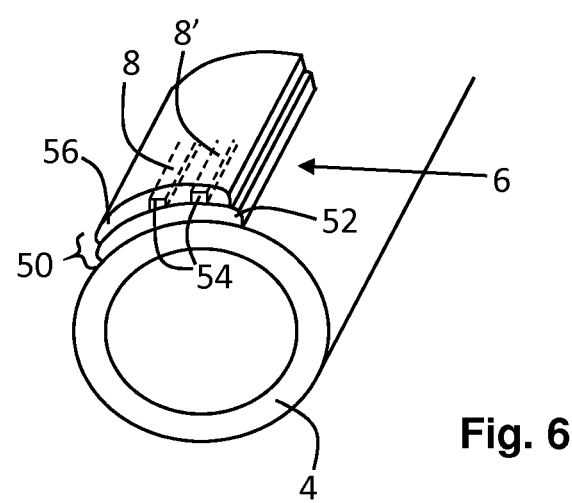
FIG. 6 illustrates schematically embodiments of a signal line formed by an electrically conducting thin-film layer of a stack of thin-film layers.

FIG. 6 illustrates schematically embodiments of a signal line 8 formed by an electrically conducting thin-film layer forming part of a stack 50 of thin-film layers deposited on the outer surface 6 of the metallic inner tube 4.

The stack 50 of thin-film layers comprises at least a first electrically isolating thin-film layer 52 and at least one electrically conducting thin-film layer 54. The first electrically isolating thin-film layer 52 is arranged to electrically isolate the at least one electrically conducting thin-film layer 54 from the metallic inner tube 4.

The signal line 8 extends in the stack 50 of thin-film layers. In these embodiments two signal lines 8, 8' are shown. The signal line 8 may be formed by the at least one electrically conducting thin-film layer 54.

The stack of thin-film layers 50 may comprise a second electrically isolating thin-film layer 56. The second electrically isolating thin-film layer 56 is arranged between the metallic outer tube (not shown) and the signal line 8. In some areas, the second electrically isolating thin-film layer 56 is arranged on top of the first electrically isolating thin-film layer 52.

Also, the stack 50 of thin-film layers may comprise one or more further thin-film layers. For instance, a seed layer may be arranged between the metallic inner tube 4 and the first electrically isolating thin-film layer 52. The seed layer may be electrically isolating, semi-conductive, or electrically conductive.

In FIG. 6, the thicknesses of the different layers 52, 54, 56 of the stack 50 of thin-film layers are greatly exaggerated.

Thin-film technology as such is well known and used for producing coatings and layers. In thin-film technology the different layers are deposited onto the base substrate, in this case the metallic inner tube 4, and onto each other. The different thin-film layers may be formed for instance, by sputtering or evaporation under vacuum. A masking layer may be provided for shaping a subsequently applied thin-film layer, the masking layer being removed after the subsequent thin-film layer has been applied.

Mentioned as an example, each of the different thin-film layers of the stack 50 of thin-film layers may have a thickness within a range of 0.01-5 μm.

As an alternative to deposition by sputtering or evaporation, atmospheric thermal spraying may be utilised for forming the stack 50 of thin-film layers. An advantage with thermal spraying may be that the process does not have to be performed under vacuum, and thus may be less costly than sputtering or evaporation under vacuum. Masking would be performed by spraying through a shadow mask or selective laser etching.

Mentioned as an example, each of the different thin-film layers of the stack 50 of thin-film layers may have a thickness within a range of 10-200 μm when the thin-film layers are formed by atmospheric thermal spraying.

The at least one electrically conducting thin-film layer 54 and any further electrically conducting thin-film layers comprise a metal or a metal alloy. The metal alloy may for instance comprise chromium.

The first and second electrically isolating thin-film layers 52, 56, and any further electrically isolating thin-film layer may be composed of an oxide or a nitride. The oxide may for instance be selected from $SiO_2$. The nitride may for instance be selected from $Si_3N_4$.

Figure 3:
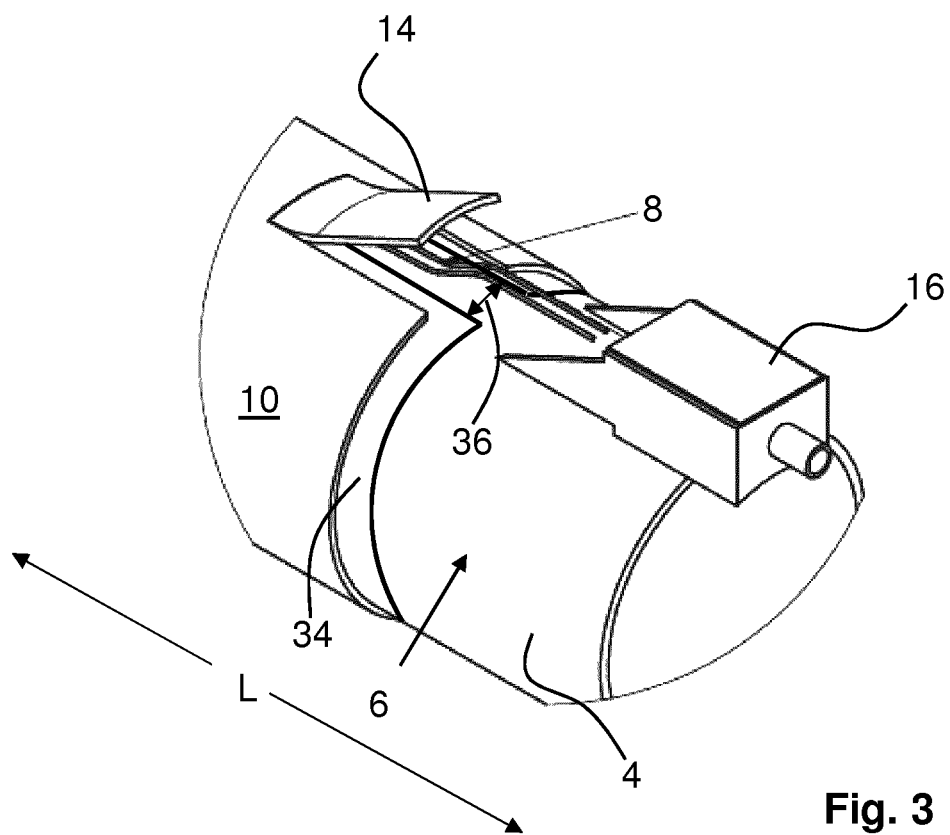
FIG. 3 illustrates an exploded view of an end portion of a metallic tube portion according to embodiments.

FIG. 3 illustrates an exploded view of an end portion of a metallic tube portion 2 according to embodiments. These embodiments resemble in much the embodiments of FIGS. 1a-2b. Accordingly, in the following mainly the differentiating features of these embodiments will be discussed.

Again, the metallic tube portion 2 has a longitudinal extension L and comprises a metallic inner tube 4 and a metallic outer tube 10. The metallic outer tube 10 extends along at least part of the metallic inner tube 4. A signal line 8 extends along the metallic inner tube 2 between the metallic inner and outer tubes 4, 10. The signal line 8 extends longitudinally along at least part of the outer surface 6 of the metallic inner tube 4. Again, a connection element comprises a protruding portion 14 and a housing member 16.

In these embodiments, the metallic tube portion 2 comprises a metallic intermediate tube 34 arranged between the metallic inner and outer tubes 4, 10. The metallic intermediate tube 34 comprises a slit 36 extending at least partially along the longitudinal extension L. The signal line 8 is arranged in the slit 36. The slit 36 forms a slot along the metallic intermediate tube 34. Suitably, the slit 36 extends along the metallic intermediate tube 34 over at least a same distance as the signal line 8 extends along the outer surface 6 of the metallic inner tube 4.

The slit 36 provides a longitudinal space extending along the metallic tube portion 2. At least the signal line 8 is arranged in the slit 36. Optionally, for instance a sensor connected to the signal line 8 may be arranged in the slit 36.

In these embodiments, the housing member 16 is welded to the protruding portion 14, the metallic outer tube 10, the metallic intermediate portion 34, and the metallic inner tube 4. Alternatively, the housing member 16 may be welded to the protruding portion 14, the metallic intermediate tube 34, and the metallic inner tube 4.

The metallic intermediate tube 34 may be arranged on the metallic inner tube 4 in a number of different ways, and the metallic outer tube 10 may be arranged on the metallic intermediate tube 34 in a number of different ways. For instance, the metallic outer tube 10, the metallic intermediate tube 34, and the metallic inner tube 4 have been joined in a drawing process. That is, the metallic inner tube 4 is positioned inside the metallic intermediate tube 34, which in turn is positioned inside the metallic outer tube 10. The thus arranged inner, intermediate, and outer tubes 4, 34, 10 are drawn through a die. A different alternative may be to join the inner, intermediate, and outer tubes 4, 34, 10 by shrink-fitting.

Figure 4:
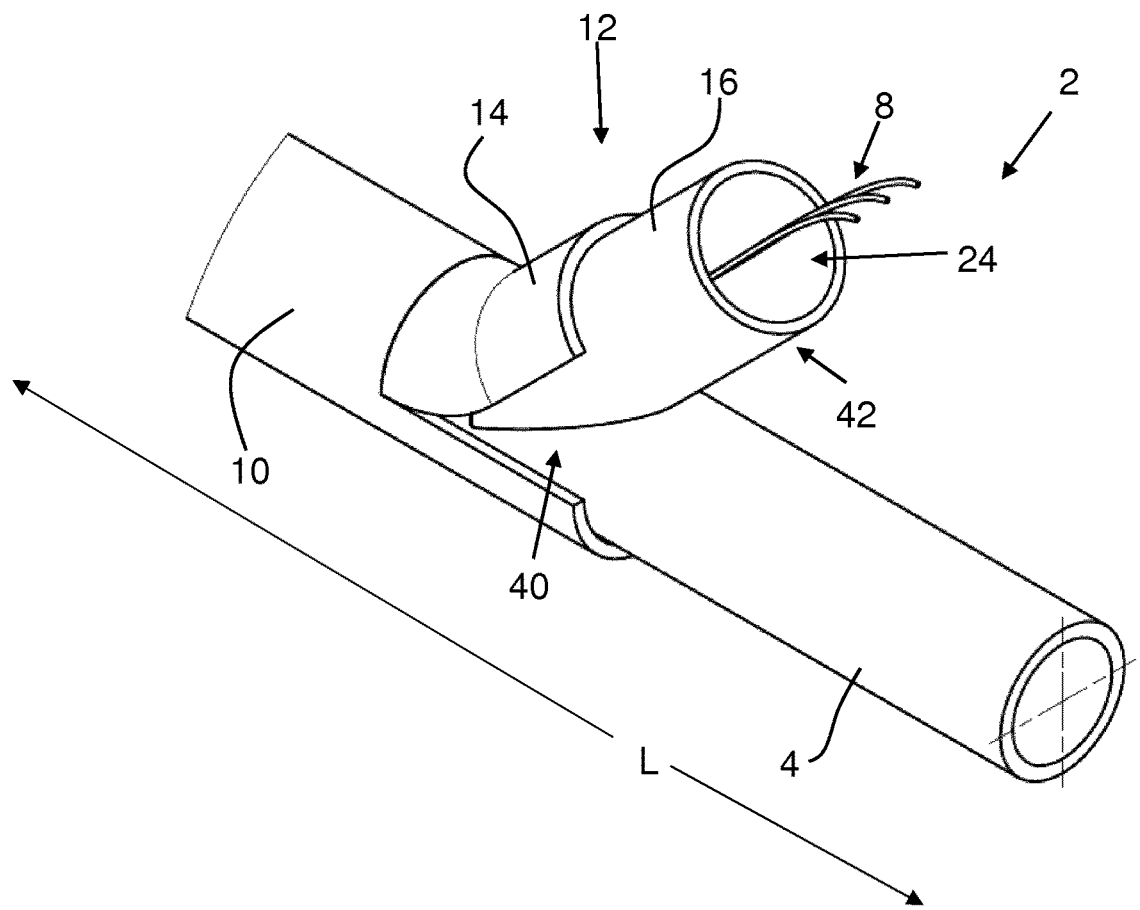
FIGS. 4 and 5 illustrate metallic tube portions according to further embodiments.

FIG. 4 illustrates an end portion of a metallic tube portion 2 according to embodiments. These embodiments resemble in much the embodiments of FIGS. 1a-3. Accordingly, in the following mainly the differentiating features of these embodiments will be discussed.

Again, the metallic tube portion 2 has a longitudinal extension L and comprises a metallic inner tube 4 and a metallic outer tube 10. The metallic outer tube 10 extends along at least part of the metallic inner tube 4. A signal line 8 extends along the metallic inner tube 2 between the metallic inner and outer tubes 4, 10. Again, a connection element 12 comprises a protruding portion 14 and a housing member 16.

In these embodiments, the housing member 16 is substantially tubularly shaped. At a first end portion 40, the housing member 16 is adapted to fit against the protruding portion 14 and the metallic inner tube 4. At a second end portion 42, the housing member 16 comprises an opening 24, through which the signal line 8, or a signal conduit connected to the signal line 8, extends. That is the opening 24 of the connection member 12 is again provided in the housing member 16.

In these embodiments, the housing member 16 is welded against the protruding portion 14 and at least a portion of the metallic inner tube 4. Optionally, the housing member 16 may be welded against the metallic outer portion 10. Access to an inside of the connection element 12 is only possible via the opening 24.

Suitably, welded joints between the housing member 16 and the protruding portion 14, and between the housing member 16 and the metallic inner tube 4 provide a gas tight seal between the housing member 16, the protruding portion 14, and the metallic inner tube 4.

Figure 5:
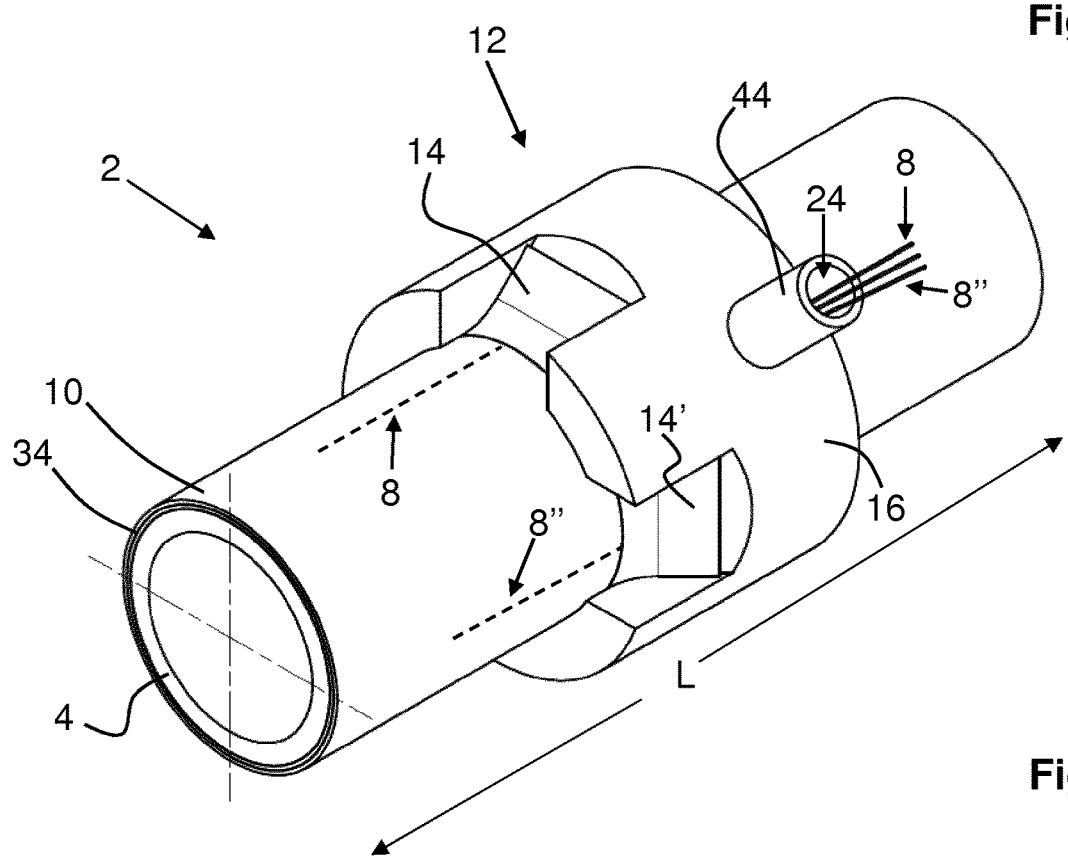

FIG. 5 illustrates an end portion of a metallic tube portion 2 according to embodiments. These embodiments resemble in much the embodiments of FIGS. 1a-4. Accordingly, in the following mainly the differentiating features of these embodiments will be discussed.

Again, the metallic tube portion 2 has a longitudinal extension L and comprises a metallic inner tube 4 and a metallic outer tube 10. The metallic outer tube 10 extends along at least part of the metallic inner tube 4. A signal line 8 extends along the metallic inner tube 2 between the metallic inner and outer tubes 4, 10. These embodiments comprise a metallic intermediate tube 34 arranged between the metallic inner and outer tubes 4, 10. Again, the metallic intermediate tube comprises a slit extending at least partially along the longitudinal extension L. The signal line 8 is arranged in the slit.

Again, a connection element 12 comprises a protruding portion 14 and a housing member 16.

In these embodiments, the housing member 16 extends around the entire metallic tube portion 2. Thus, also the connection element 12 extends around the entire metallic tube portion 2. The housing member 16 has a tubular shape with a larger diameter than the metallic outer tube 10. The protruding portion 14 is welded against the housing member 16. The housing member 16 is also welded to a further portion of the metallic outer tube 10. More specifically, adjacent to the protruding portion 14, the housing member 14 is circumferentially welded against the metallic outer tube 10. At an opposite longitudinal end of the housing member 16, i.e. not visible in FIG. 5, the housing member 16 may be welded against the metallic inner and/or intermediate and/or outer tube 4, 34, 10.

Suitably, welded joints between the housing member 16 and the protruding portion 14, and between the housing member 16 and the metallic inner and/or intermediate and/or outer tube 4, 34, 10 provide a gas tight seal between the housing member 16, the protruding portion 14, the metallic outer tube 10 and the metallic inner and/or intermediate and/or outer tube 4, 34, 10.

Again, the connection portion comprises an opening 24 for the signal line 8, or a signal conduit connected to the signal line 8. The opening 24 is arranged in a short pipe 44 forming part of the housing member 16.

In these embodiments, the metallic tube portion 2 comprises a further signal line 8" arranged between the metallic inner and outer tubes 4, 10, at a different circumferential position of the metallic inner tube 4 than the signal line 8. The further signal line 8" is also diverted from the metallic inner tube 4 in the connection element 12. The further signal line 8", or a signal conduit connected to the further signal line, extends via the opening 24.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

The invention claimed is:

1. A metallic tube portion having a longitudinal extension and comprising
   a metallic inner tube having an outer surface,
   a signal line extending longitudinally along at least part of the outer surface of metallic inner tube,
   a metallic outer tube extending along at least part of the metallic inner tube outside of the metallic inner tube and outside of the signal line, and
   optionally a metallic intermediate tube arranged between the metallic inner and outer tubes,
   wherein the metallic tube portion comprises a connection element,
   wherein the connection element comprises a protruding portion of the metallic outer tube and a housing member, the housing member being welded to the protruding portion and at least a further portion of the metallic outer tube, and/or a portion of the metallic inner tube, and/or a portion of the metallic intermediate tube, and wherein the signal line, and/or a signal conduit connected to the signal line, extends at least partially through the connection element.

2. The metallic tube portion according to claim 1, wherein at least part of the signal line, and/or at least part of the signal conduit, extends separated from the metallic inner tube within the connection element.

3. The metallic tube portion according to claim, wherein the protruding portion of the metallic outer tube protrudes from an outer surface of the metallic tube portion , and wherein the signal line, and/or the signal conduit, extends underneath the protruding portion.

4. The metallic tube portion according to claim 1, wherein the protruding portion of the metallic outer tube is integrally formed with the metallic outer tube.

5. The metallic tube portion according to claim 1, wherein the connection element comprises an opening for leading the signal line, and/or the signal conduit, therethrough.

6. The metallic tube portion according to claim 1, wherein the signal line comprises an electrically conducting thin-film layer forming part of a stack of thin-film layers deposited on the outer surface of the metallic inner tube.

7. The metallic tube portion according to claim 1, wherein the signal line comprises a wire and/or a fibre.

8. The metallic tube portion according to claim 1, wherein the metallic outer tube and the metallic inner tube have been joined in a drawing process.

9. The metallic tube portion according to claim 1, comprising a metallic intermediate tube arranged between the metallic inner and outer tubes, wherein the metallic intermediate tube comprises a slit extending at least partially along the longitudinal extension, and wherein the signal line is arranged in the slit.

10. The metallic tube portion according to claim 9, wherein the metallic outer tube, the metallic intermediate tube, and the metallic inner tube have been joined in a drawing process.

11. The metallic tube portion according to claim 1, comprising a sensor, wherein the sensor is arranged on the outer surface of the metallic inner tube, and wherein the signal line is connected to the sensor.

12. The metallic tube portion according to claim 11, wherein the metallic outer tube extends over the sensor.

13. The metallic tube according to claim 11, wherein the sensor is selected from one of a resistive sensor, a capacitive sensor, a thermocouple, a fibre Bragg grating sensor, or a combination thereof.

* * * * *